United States Patent Office 3,486,105
Patented Dec. 23, 1969

3,486,105
STABILIZED HIGH VOLTAGE SOURCE
André Breniere, Paris, France, assignor to CSF-Compagnie Generale de Telegraphie Sans Fil, a corporation of France
Filed Mar. 5, 1968, Ser. No. 710,617
Claims priority, application France, Apr. 10, 1967, 98,358
Int. Cl. H02m 7/44, 7/68
U.S. Cl. 321—18                                    4 Claims

ABSTRACT OF THE DISCLOSURE

A stabilized high voltage source comprises a step-up transformer whose secondary is connected to a rectifying circuit and whose primary is connected through a diode bridge to an A.C. supply source. This diode bridge is controlled by a thyristor which is itself controlled by a magnetic amplifier. An RC circuit controls the establishment of the unidirectional high voltage, when the stabilized source is switched on, by acting on the control current of the magnetic amplifier.

---

The present invention relates to stabilized high voltages sources for the anode supply of electronic tubes, such as, for example, magnetrons which in certain cases require an anode voltage which is stabilized to within less than 0.5% for mains supply variations as high as ±10%.

In one known type of supply sources, high D.C. voltage is obtained by rectification of a voltage taken from the secondary of a step-up transformer, whose primary is connected to an A.C. source across a diode bridge controlled by a thyristor having a gate biased by a voltage which varies as a function of error signals derived from variations in the rectified high voltage.

Sources of this kind do effect good stabilization of the nominal high voltage level at which the tubes are operated. However, if at the instant of switch-on, the mains voltage is too high, the regulating circuit has no time to become effective. The high voltage applied to the tubes may then momentarily be higher than the maximum permissible level, with the consequent risk of serious damage to the tubes and associated circuits.

It is the object of the invention to overcome this drawback by making the build-up of the high voltage last for a sufficiently long time.

According to the invention there is provided a stabilized high voltage source, for supplying a unidirectional high voltage, comprising: an A.C. supply source; a step-up transformer having a primary and a secondary winding; rectifying means connected to said secondary winding and having an output for providing said unidirectional high voltage; switching means connected between said A.C. source and said primary winding; a diode bridge connected between said A.C. source and said primary winding; a thyristor for controlling said bridge, said thyristor having a gate; biasing means for supplying a bias voltage to said gate; controlling means for controlling said bias voltage as a function of said unidirectional high voltage; and starting means for causing said controlling means to establish progressively said bias voltage upon said stabilized source being switched on by said switching means.

Figure 1:
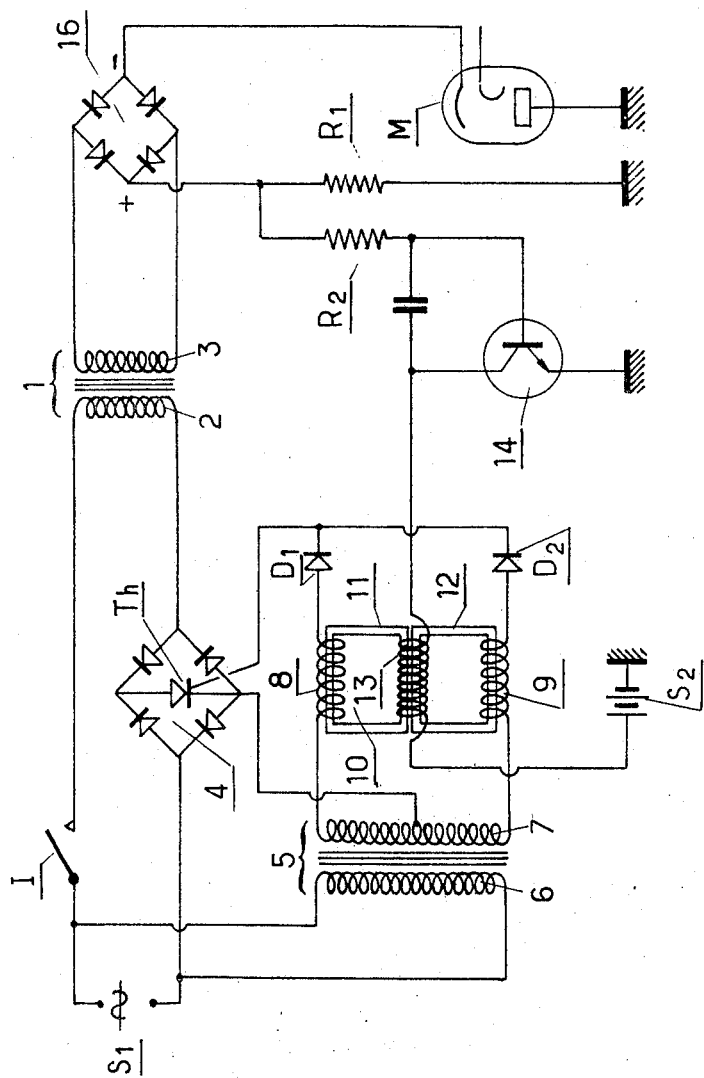
Figure 2:
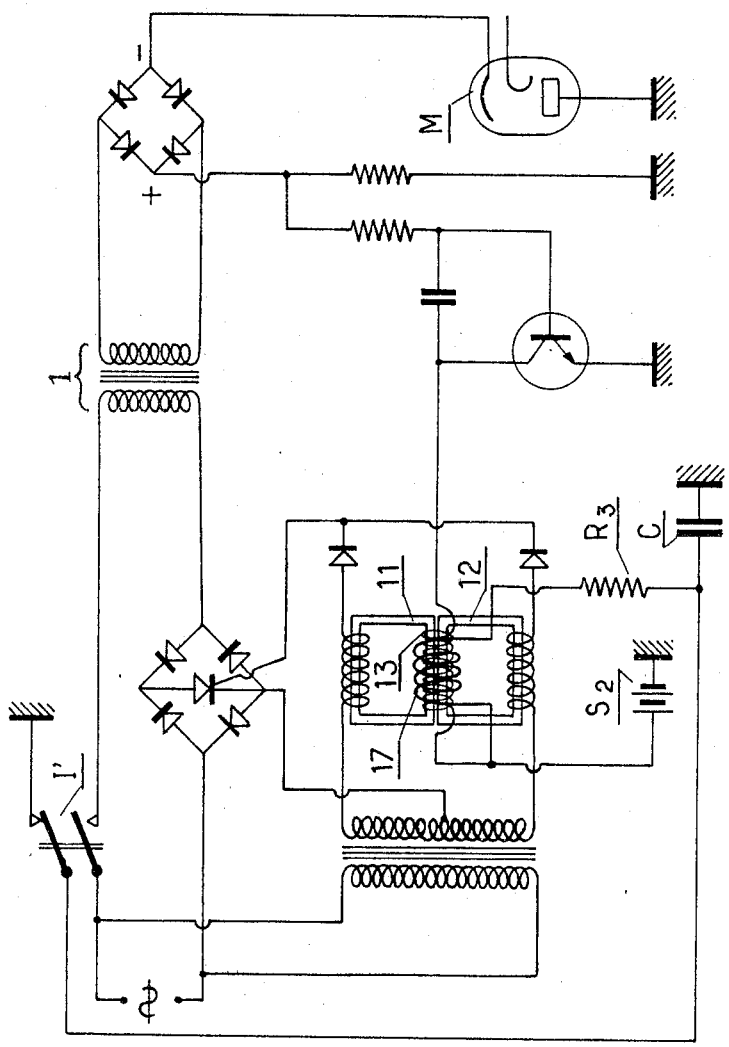
Figure 3:
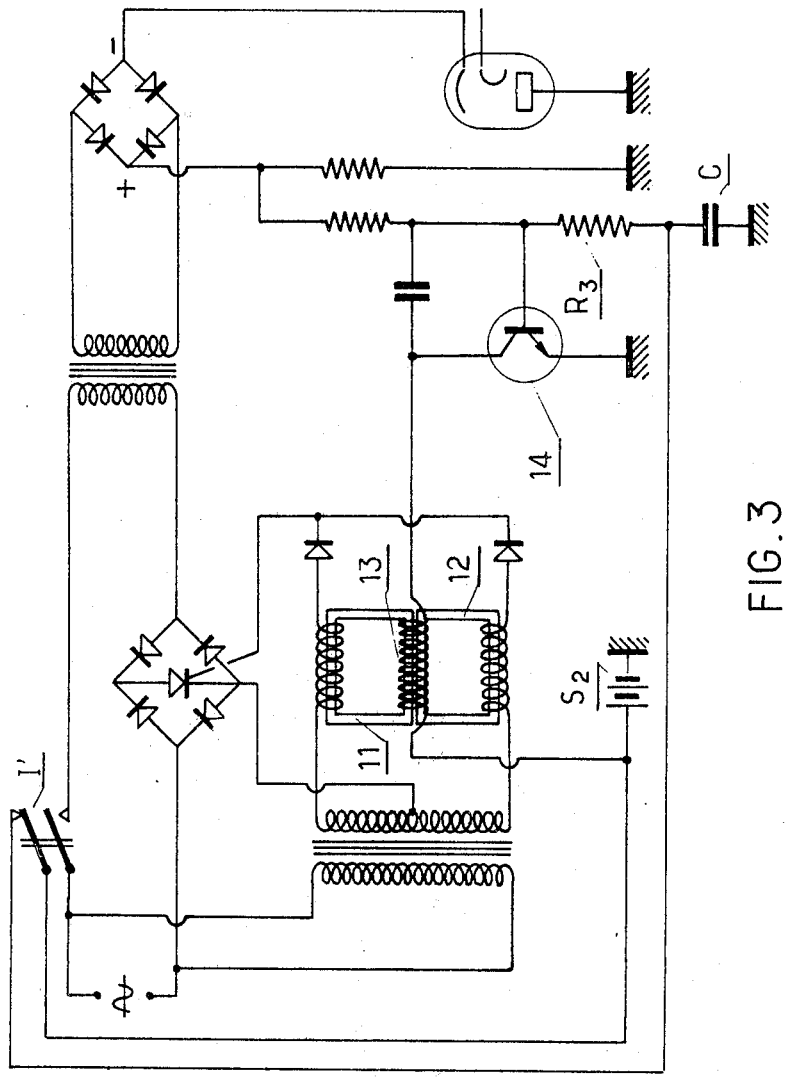
Figure 4:
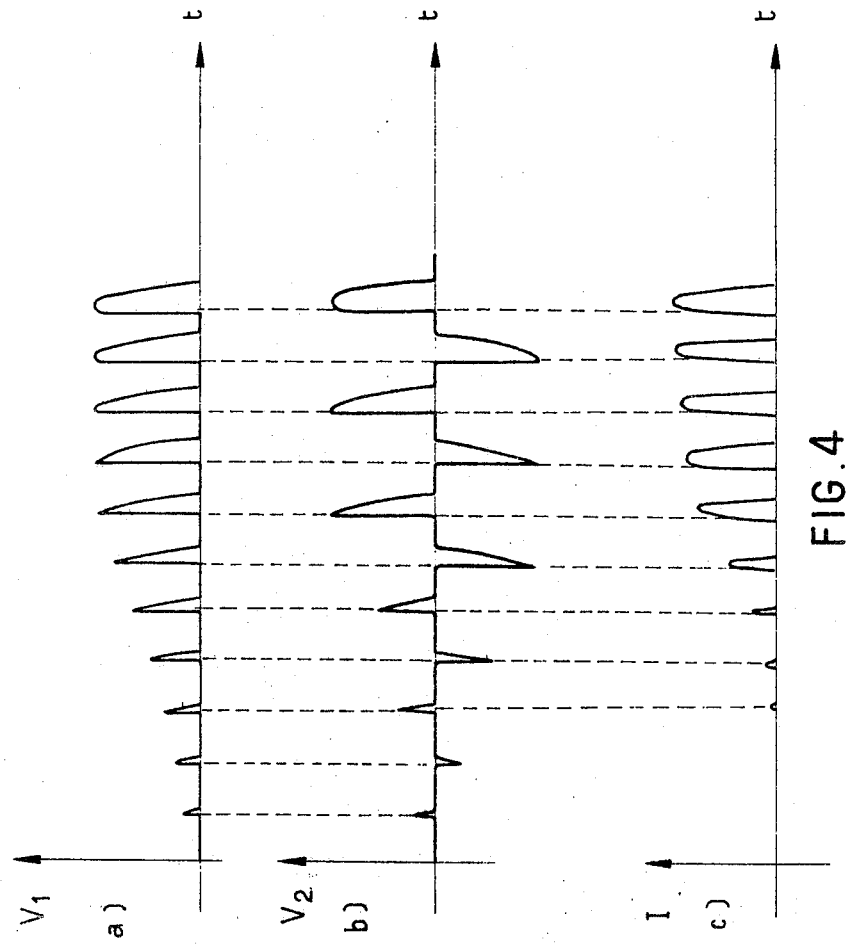

For a better understanding of the invention and to show how the same may be carried into effect reference will be made to the drawings accompanying the following description and in which:

FIG. 1 is a circuit diagram of a known stabilized high voltage source;
FIG. 2 illustrates a first embodiment of the invention;
FIG. 3 is the diagram of another embodiment of the invention; and
FIG. 4 is an explanatory diagram.

The circuit diagram of the known high voltage source of FIG. 1 comprises a step-up transformer 1 with a primary winding 2 and a secondary winding 3. The primary winding 2 is connected to an alternating voltage source $S_1$, for example 220 volts ±10%, in series with a single-pole switch I and two opposite terminals of a diode bridge 4 between whose other two terminals is connected a thyristor T$h$. The thyristor (a four-layer silicon diode) is, as well known, the equivalent of a gasfilled thyratron and contains three electrodes: a cathode, an anode and a gate.

Across the alternating voltage source $S_1$, there is connected the primary 6 of a transformer 5 whose secondary 7, provided with a centre-tap, feeds two operating windings 8 and 9 of a self-saturated magnetic amplifier 10. The windings 8 and 9 are formed on two adjacent cores 11 and 12 made of a magnetic material having a rectangular hysteresis loop. In series with the windings 8 and 9, there are respectively connected two diodes $D_1$ and $D_2$ whose junction point is connected to the gate of the thyristor T$h$, whilst the cathode of the thyristor is connected to the centre-tap of the secondary winding 7.

The magnetic amplifier 10 also incorporates a control winding 13, which is wound about both cores 11 and 12 and is supplied with direct current by a source $S_2$ in series with a transistor 14 connected to operate as an integrator.

The secondary 3 of the transformer 1 feeds a bridge rectifier 16 which, across the terminals + and −, produces a direct high voltage which can be applied to any desired load, for example a magnetron M in series with a resistor $R_1$.

The junction point of the rectifier 16 and the resistor $R_1$, is connected across a resistor $R_2$ to the base of the transistor 14.

It will be understood that this known arrangement operates in the following manner:

In the resting state, with the switch I open, the windings 8 and 9 of the amplifier 10 are fed across the transformer 5, but no current flows through the control winding 13 since the transistor is blocked, its base having no supply. In the absence of any magnetomotive force in the winding 13, the cores 8 and 9 remain saturated and the amplifier 10 is completely unblocked. Both half-waves of the current in the transformer 5 are entirely passed through the respective diodes $D_1$, $D_2$ to the cathode-gate space of the thyristor T$h$ which is thus operating for the major part of each half-waves. In other words, the angle through which the thyristor is operating or conductive, is large when the contact-breaker I is open.

When the contact-breaker I is subsequently closed (operative position), the rectifier 16, fed from the transformer 1, furnishes a rectified current to the load i.e. to the magnetron M and the resistor $R_1$. The transistor 14 is unblocked and the source $S_2$ feeds a current through the winding 13. The ampere-turns of the winding 13 reduce the saturation of the cores 8 and 9 and the angle for which the amplifier 10 is open decreases as a function of the ampere-turns figure. The result is a reduction in the gate bias and in the angle for which the thyristor regulating the current through the bridge 4 and the voltage across the terminals of the transformer 1, is open.

If, for whatever reason, and in particular as a consequence of fluctuations in the voltage $S_1$, the rectified current has any tendency to fluctuate, these fluctuations are transmitted to the control winding 13 and this in turn affects the gate bias in such a way that the angle for which the thyristor T$h$ is open varies in order to counteract the variation which has produced it. The rectified current is thus regulated and the high voltage stabilized.

FIG. 2 illustrates the circuit of FIG. 1 modified in accordance with the present invention. In this circuit, an additional winding 17 is wound in common around the two cores 11 and 12, outside or side by side with the winding 13. One end of the winding 17 is connected to the direct voltage source $S_2$, and the other end to a resistor $R_3$ in series with a capacitor C one of whose terminals is earthed.

The single-pole switch I of FIG. 1, is replaced in this case by a two-pole switch I'. One pole of the switch I' serves, in the same way as in the circuit of FIG. 1, to open and close the circuit supplying the transformer 1, whilst the other pole of this switch enables the capacitor C to be short-circuited or this short-circuit to be removed. The contacts of the switch I' are so arranged that, when the contacts of one pole are open, those of the other are closed, and vice versa.

This arrangement operates as follows:

In the rest state contact-breaker I' in the position shown in the drawing), the source $S_2$ feeds a current through the winding 17. The magnetic amplifier 10 is thus heavily blocked and the bias supplied to the gate of the thyristor is too weak; the thyristor does not strike.

Upon the contact-breaker I' being placed in the operating position (manual control or automatic control by relay, not shown), the capacitor C is no longer short-circuited. The current in the winding 17 drops to zero exponentially, with the time constant $R_3C$, corresponding to the charge on the capacitor C. The cores 11 and 12 are progressively saturated and the amplifier 10 unblocks, the gate bias and the angle for which the thyristor is open, rising and causing the rectifier current to build up in accordance with the same exponential law. Thus, if at the time of switching in the rectifier the mains voltage (source $S_1$) is too high, the voltage supplied to the magnetron M rises progressively and the regulating system has sufficient time to step in and prevent the voltage from reaching an excessively high level, such as would be incompatible with a safe operation of the tube and the associated circuits.

FIG. 3 illustrates another embodiment of the invention. In this embodiment, a resistor $R_3$ is connected, across the top pole of the contact-breaker I', between the source $S_2$ and the base of the transistor 14, whilst a capacitor C is connected between earth and the junction of contact-breaker and resistor $R_3$.

With the contact-breaker in the rest position, the source $S_2$ feeds a current through the transistor 14 and the winding 13. The amplifier 10 is blocked. With the contact-breaker I' in the operating position, the current producing the blocking effect gradually decays until the capacitor C is completely discharged. The decay function is an exponential one (time constant RC) as in the case of FIG. 2, and operation is identical in both cases.

FIG. 4 illustrates the starting characteristic obtained by means of the invention, using the circuits of FIGS. 2 and 3.

In this figure, the following values have been plotted as a function of time $t$:

(a) the direct voltages $V_1$ appearing between cathode and gate of the thyristor $Th$ after the arrangement has been put into service by placing the contact-breaker I' in the operating position;

(b) the alternating voltages $V_2$ appearing across the transformer 1;

(c) the unidirectional currents I corresponding, in the load, to the output from the rectifier 16.

The ordinate scale is not the same in all three graphs.

Of course the invention is not limited to the embodiments described and shown which were given solely by way of example.

What is claimed is:

1. A stabilized high voltage source, for supplying a unidirectional high voltage, comprising: an A.C. supply source; a step-up transformer having a primary and a secondary winding; rectifying means connected to said secondary winding and having an output for providing said unidirectional high voltage; switching means connected between said A.C. source and said primary winding; a diode bridge connected between said A.C. source and said primary winding; a thyristor for controlling said bridge, said thyristor having a gate; biasing means for supplying a bias voltage to said gate; controlling means for controlling said bias voltage as a function of said unidirectional high voltage; and starting means for causing said controlling means to establish progressively said bias voltage upon said stabilized source being switched on by said switching means.

2. A stabilized high voltage source as claimed in claim 1, wherein said biasing means comprise a second transformer having a secondary winding and full-wave rectifying means connected between said second transformer and said gate, said controlling means comprise a magnetic amplifier, connected between said second transformer and said full-wave rectifying means and having at least one control winding, and means for causing, as a function of the value of said unidirectional high voltage, a first control current to flow through said control winding, and said starting means comprise a RC circuit.

3. A stabilized high voltage source as claimed in claim 2, wherein said magnetic amplifier comprises a second control winding, said starting means comprises a resistance and a capacitor, connected in series with one end of said second control winding, and D.C. supply means having two terminals, one of said terminals being connected to the other end of said second control winding, and said switching means comprise a switch for connecting the other of said terminals to the junction of said resistance and said capacitor, upon said stabilized source being switched out by said switching means, and to the free end of said capacitor, upon said stabilized source being switched on by said switching means.

4. A stabilized high voltage source as claimed in claim 2, wherein said means for causing a first control current to flow through said control winding comprise a D.C. supply source having two terminals and a transistor connected, in series with said control winding, to one of said terminals and having a base, said starting means comprise a resistance and a capacitor connected in series between said base and the other of said terminals and said switching means comprise a circuit-breaker for connecting said one of said terminals to the junction of said resistance and said capacitor upon said stabilized source being switched out by said switching means.

References Cited

UNITED STATES PATENTS

| 3,207,931 | 9/1965 | Pintell | 321—18 |
| 3,207,975 | 9/1965 | Pintell | 321—16 XR |
| 3,218,540 | 11/1965 | Jackson | 321—18 |
| 3,293,533 | 12/1966 | Covert | 321—47 |
| 3,313,996 | 4/1967 | Lingle | 321—46 XR |
| 3,356,927 | 12/1967 | Barron | 321—18 |

LEE T. HIX, Primary Examiner

W. M. SHOOP, JR., Assistant Examiner

U.S. Cl. X.R.

321—47